United States Patent
Shibano

(10) Patent No.: US 12,341,339 B2
(45) Date of Patent: Jun. 24, 2025

(54) TERMINAL APPARATUS, METHOD, AND STORAGE MEDIUM

(71) Applicant: TOYOTA JIDOSHA KABUSHIKI KAISHA, Toyota (JP)

(72) Inventor: Takumi Shibano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 17/894,502

(22) Filed: Aug. 24, 2022

(65) Prior Publication Data

US 2023/0076679 A1    Mar. 9, 2023

(51) Int. Cl.
*H02J 3/14*    (2006.01)
*H02J 3/00*    (2006.01)
*H02J 13/00*    (2006.01)

(52) U.S. Cl.
CPC .............. *H02J 3/144* (2020.01); *H02J 3/003* (2020.01)

(58) Field of Classification Search
CPC ....... H02J 3/144; H02J 3/003; H02J 13/00001
USPC ........................................................ 700/295
See application file for complete search history.

(56) References Cited

U.S. PATENT DOCUMENTS

| 11,616,391 B2 * | 3/2023 | Park | H02J 3/14 |
| | | | 700/286 |
| 2003/0117278 A1 * | 6/2003 | Fukuda | G05B 23/027 |
| | | | 340/506 |

FOREIGN PATENT DOCUMENTS

| JP | H07-110754 A | 4/1995 |
| JP | 2018-206434 A | 12/2018 |
| WO | 2020/084838 A1 | 4/2020 |

* cited by examiner

*Primary Examiner* — Michael J Brown
(74) *Attorney, Agent, or Firm* — Oliff PLC

(57) ABSTRACT

A terminal apparatus includes a communication unit configured to communicate with at least one device that a user uses, an input and output unit, and a control unit. The control unit is configured to identify a device to be controlled, of the at least one device, as a subject device, cause the input and output unit to display at least one first region indicating an amount of electric power used by the at least one subject device by area, and receive input of an operation to expand or contract the first region and control the subject device in accordance with the operation.

17 Claims, 7 Drawing Sheets

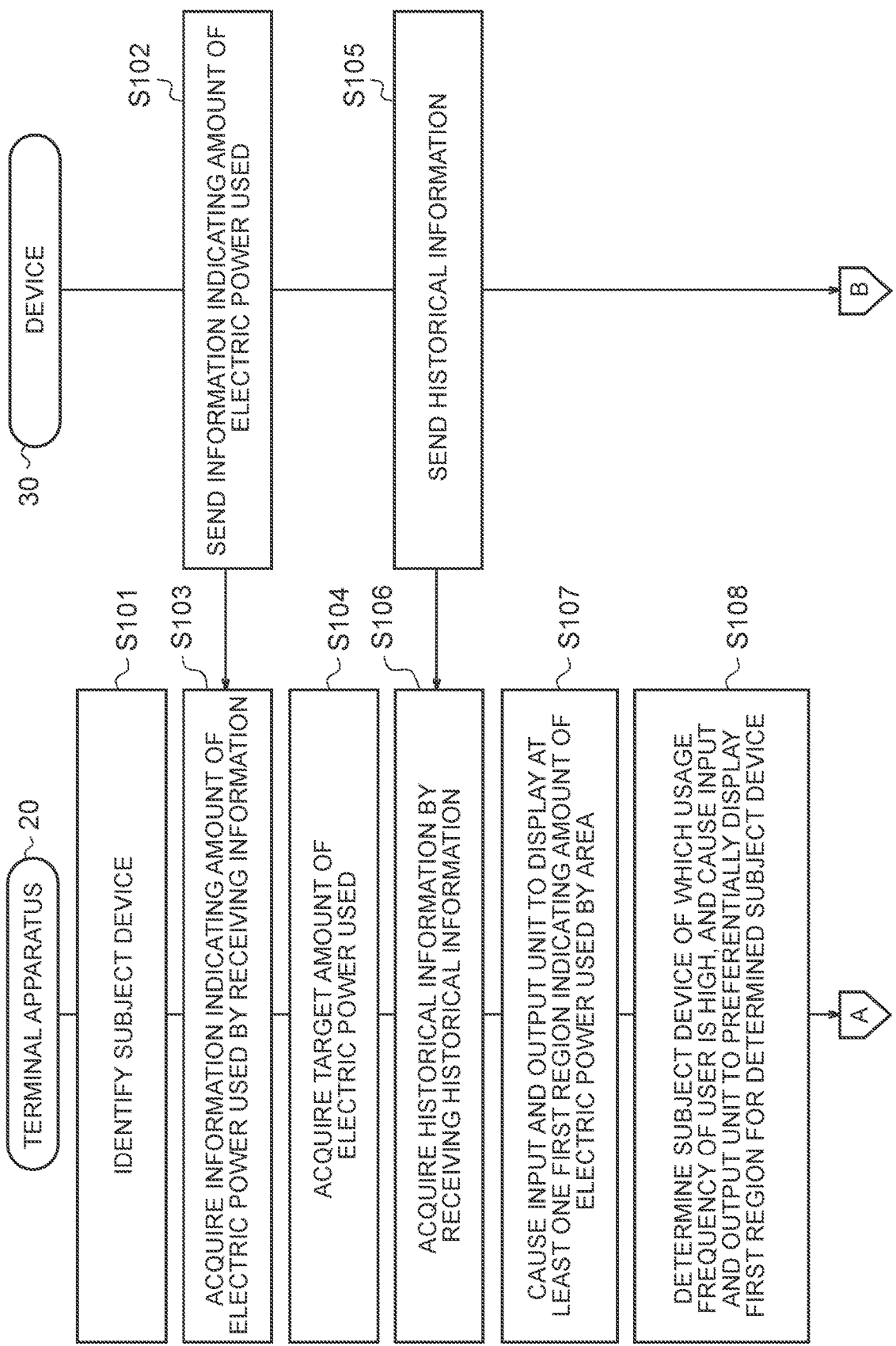

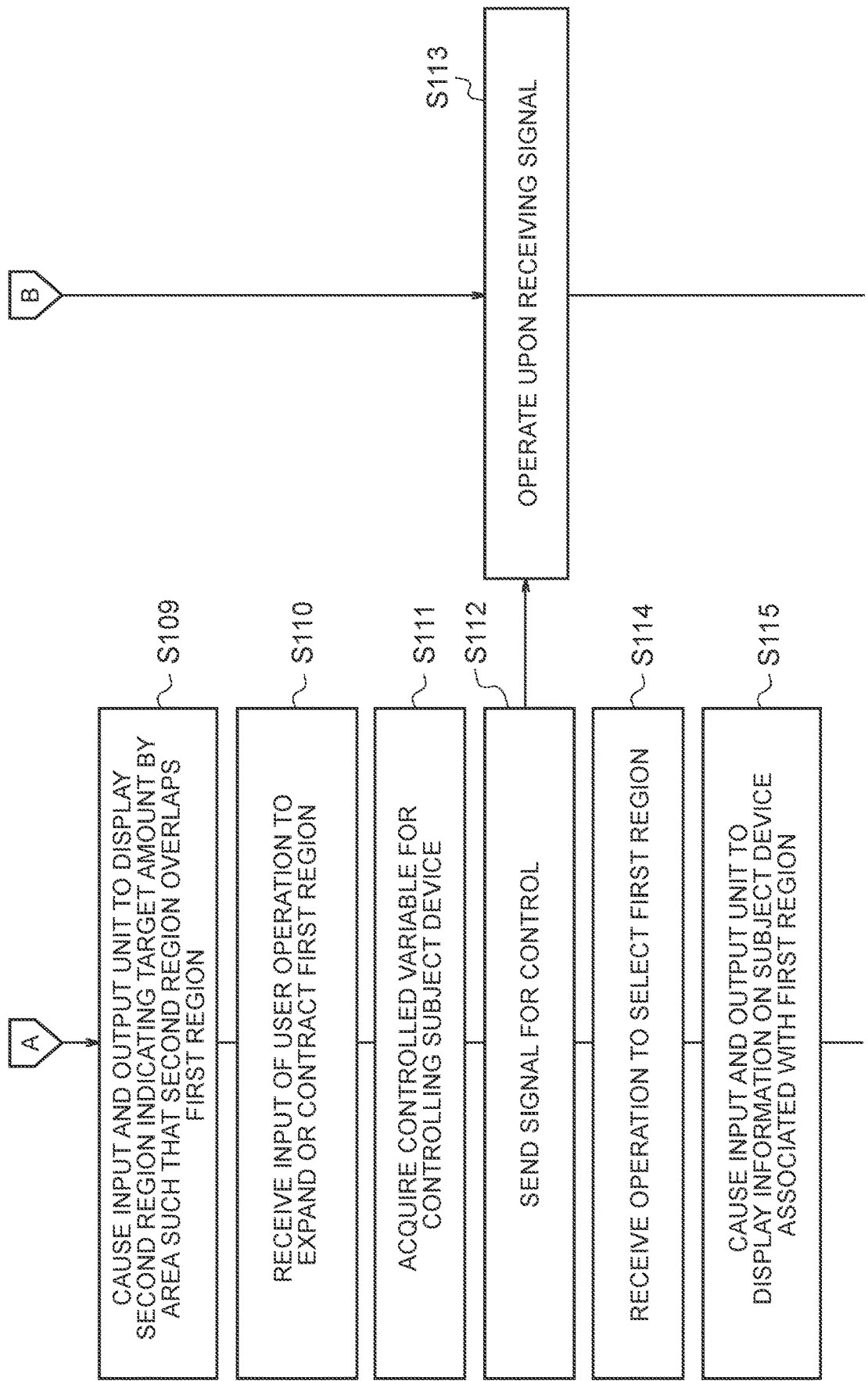

TERMINAL APPARATUS, METHOD, AND STORAGE MEDIUM

CROSS-REFERENCE TO RELATED APPLICATION

This application claims priority to Japanese Patent Application No. 2021-145038 filed on Sep. 6, 2021, incorporated herein by reference in its entirety.

BACKGROUND

1. Technical Field

The disclosure relates to a terminal apparatus, a method, and a storage medium.

2. Description of Related Art

Japanese Unexamined Patent Application Publication No. 07-110754 (JP 07-110754 A) describes a technology for displaying the image of an icon as a graphical user interface and controlling the graphical user interface such that the display size of the icon is increased as the number of times an instruction is input to the icon increases and the display size of the icon is reduced as the number of times an instruction is input to the icon reduces.

SUMMARY

There is room for improvement in a technique for improving the operability of a user by using an image as a graphical user interface.

The disclosure improves a technique for improving the operability of a user by using an image as a graphical user interface.

An aspect of the disclosure provides a terminal apparatus. The terminal apparatus includes a communication unit configured to communicate with at least one device that a user uses, an input and output unit, and a control unit. The control unit is configured to identify a device to be controlled, of the at least one device, as a subject device. The control unit is configured to cause the input and output unit to display at least one first region indicating an amount of electric power used by the subject device by area. The control unit is configured to receive input of an operation to expand or contract the first region and control the subject device in accordance with the operation.

A second aspect of the disclosure provides a method. The method is executed by a computer including an input and output unit and a communication unit configured to communicate with at least one device that a user uses. The method includes identifying a device to be controlled, of the at least one device, as a subject device, causing the input and output unit to display at least one first region indicating an amount of electric power used by the subject device by area, and receiving input of an operation to expand or contract the first region and controlling the subject device in accordance with the operation.

A third aspect of the disclosure provides a storage medium that stores a program. The program causes a computer including an input and output unit and a communication unit configured to communicate with at least one device that a user uses, to execute functions. The functions include identifying a device to be controlled, of the at least one device, as a subject device, causing the input and output unit to display at least one first region indicating an amount of electric power used by the subject device by area, and receiving input of an operation to expand or contract the first region and controlling the subject device in accordance with the operation.

According to the aspects of the disclosure, it is possible to improve a technique for improving the operability of a user by using an image as a graphical user interface.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6A is a flowchart showing the operation of the system according to the embodiment of the disclosure; and FIG. 6B is a flowchart showing the operation of the system according to the embodiment of the disclosure.

DETAILED DESCRIPTION OF EMBODIMENTS

Figure 1:
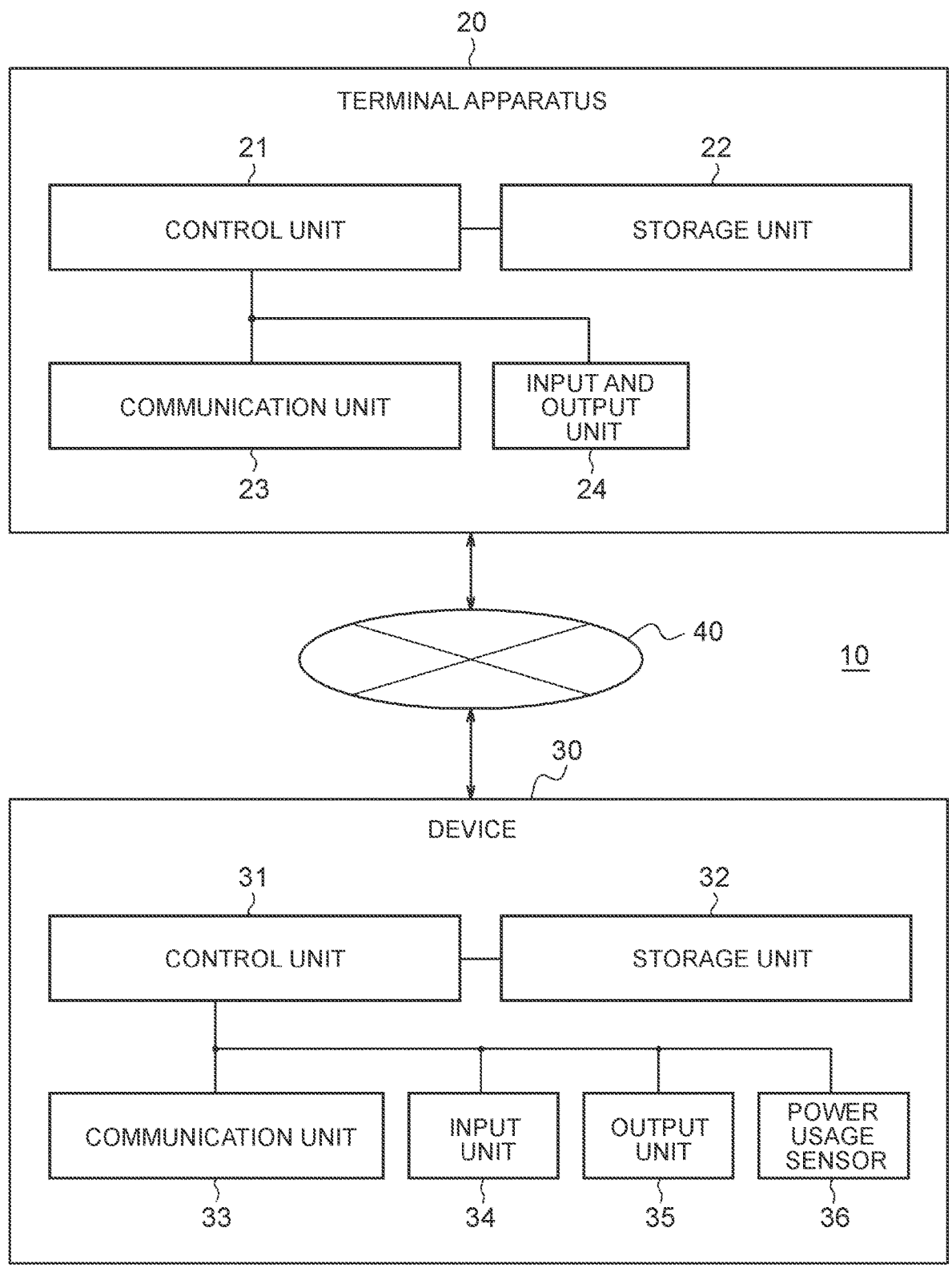
FIG. 1 is a diagram showing the schematic configuration of a system according to an embodiment of the disclosure.

Hereinafter, an embodiment of the disclosure will be described with reference to the accompanying drawings.

Like reference signs denote the same or corresponding portions in the drawings. In the description of the present embodiment, the description of the same or corresponding portions is omitted or simplified as needed.

The outline of a system 10 according to the embodiment of the disclosure will be described with reference to FIG. 1. The system 10 includes a terminal apparatus 20 and a device 30. The terminal apparatus 20 and the device 30 are connected so as to communicate via a network 40.

The terminal apparatus 20 is carried by a user U. The terminal apparatus 20 is, for example, a mobile device or a PC. Examples of the mobile device include a mobile phone, a smartphone, a wearable device, and a tablet terminal. The PC is an abbreviation of personal computer. The user U is able to control the device 30 from inside or outside a home by using the terminal apparatus 20.

The device 30 is a device that the user U uses in home and is controllable with the use of the terminal apparatus 20. Examples of the device 30 specifically include an air conditioner, a room light, a refrigerator, and a television. The device 30 is not limited thereto. Examples of the device 30 may include a bath, a washing machine, a cooker, such as a microwave oven, a vacuum cleaner, a curtain, and an audio device. FIG. 1 shows only one device 30 for the sake of convenience. The number of devices 30 may be multiple, and the number of devices 30 of the same type may be multiple.

The network 40 includes the Internet, at least one WAN, at least one MAN, or any combination of them. The WAN is an abbreviation of wide area network. The MAN is an abbreviation of metropolitan area network. The network 40 may include at least one wireless network, at least one optical network, or a combination of them. Examples of the wireless network include an ad hoc network, a cellular network, a wireless LAN, a satellite communication network, and a terrestrial microwave network. The LAN is an abbreviation of local area network.

The outline of the present embodiment will be described first, and the details will be described later. The terminal apparatus 20 communicates with at least one device 30 that the user U uses. The terminal apparatus 20 identifies a device 30 to be controlled, of the devices 30, as a subject device 30, causes the input and output unit 24 to display at least one first region indicating the amount of electric power used by the subject device 30 by area, and receives input of an operation to expand or contract the first region and controls the subject device 30 in accordance with the operation.

The amount of electric power used is the amount of electric power consumed by the subject device 30 within a predetermined period. Information indicating the amount of electric power used is sent from the device 30 to the terminal apparatus 20, and the terminal apparatus 20 is able to acquire the amount of electric power used. The first region, as will be described below, is a two-dimensional image displayed on the input and output unit 24 and has an area according to the amount of electric power used by the device 30. The area of the first region increases as the amount of electric power used increases. In the present embodiment, the shape of the first region is a rounded-corner rectangular shape; however, the shape of the first region is not limited thereto. The shape of the first region may be a circular shape, a selected polygonal shape, or a selected shape, such as a heart shape and an animal shape. The area of the first region reduces when the user U touches the input and output unit 24 with fingers to pinch in on the first region. The area of the first region expands when the user U pinches out on the first region. The terminal apparatus 20 controls the device 30 in accordance with a controlled variable according to the amount of change in the area of the first region.

According to the present embodiment, the terminal apparatus 20 displays the first region indicating the amount of electric power used by the device 30 by area, so the user U is able to intuitively grasp the amount of electric power used. The user U is able to easily control the device 30 by inputting an operation to expand or contract the first region to change the controlled variable of the device 30. Thus, it is possible to improve a technique for improving the operability of a user by using an image as a graphical user interface.

Figure 2:
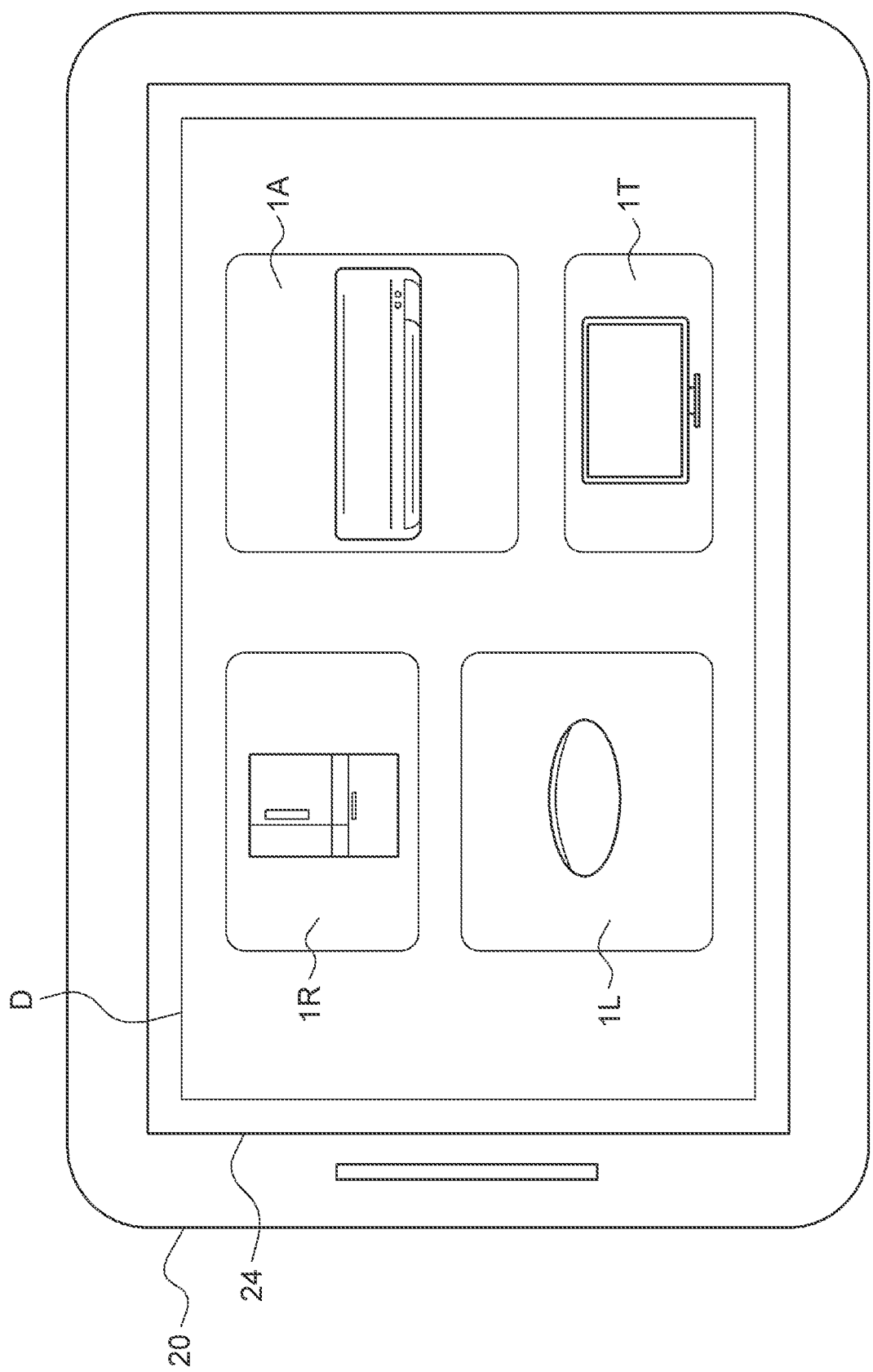
FIG. 2 is a view showing an example of a screen displayed on an input and output unit of a terminal apparatus according to the embodiment of the disclosure.

The configuration of the terminal apparatus 20 according to the present embodiment will be described with reference to FIG. 2.

The terminal apparatus 20 includes a control unit 21, a storage unit 22, a communication unit 23, and the input and output unit 24.

The control unit 21 includes at least one processor, at least one dedicated circuit, or a combination of them. The processor is, for example, a general-purpose processor, such as a CPU and a GPU, or a special-purpose processor specialized in a specific process. The CPU is an abbreviation of central processing unit. The GPU is an abbreviation of graphics processing unit. The dedicated circuit is, for example, an FPGA or an ASIC. The FPGA is an abbreviation of field-programmable gate array. The ASIC is an abbreviation of application specific integrated circuit. The control unit 21 executes a process related to the operation of the terminal apparatus 20 while controlling the units of the terminal apparatus 20. The control unit 21 is able to acquire information indicating a log or the like related to the usage history of each device 30 from the device 30, store the acquired information in the storage unit 22, and manage the information. The control unit 21 is able to generate a signal for controlling each device 30 and send the signal to the device 30 via the communication unit 23.

The storage unit 22 includes at least one semiconductor memory, at least one magnetic memory, at least one optical memory, or a combination of at least two types of them. The semiconductor memory is, for example, a RAM or a ROM. The RAM is an abbreviation of random access memory. The ROM is an abbreviation of read only memory. The RAM is, for example, an SRAM or a DRAM. The SRAM is an abbreviation of static random access memory. The DRAM is an abbreviation of dynamic random access memory. The ROM is, for example, an EEPROM. The EEPROM is an abbreviation of electrically erasable programmable read only memory. The storage unit 22 may function as, for example, a main storage device, an auxiliary storage device, or a cache memory. The storage unit 22 stores information used in the operation of the terminal apparatus 20 and information obtained through the operation of the terminal apparatus 20.

The communication unit 23 includes at least one communication interface. The communication interface is, for example, an interface that supports a mobile communication standard, such as LTE, 4G standard, and 5G standard, an interface that supports near field communication, such as Bluetooth (registered trademark), or a LAN interface. The LTE is an abbreviation of long term evolution. The 4G is an abbreviation of 4th generation. The 5G is an abbreviation of 5th generation. The communication unit 23 receives information used in the operation of the terminal apparatus 20 and sends information obtained through the operation of the terminal apparatus 20.

The input and output unit 24 includes at least one input and output interface. The input and output interface includes a touch screen provided integrally with a display. The input and output unit 24 receives an operation to input information used in the operation of the terminal apparatus 20 and outputs information obtained through the operation of the terminal apparatus 20. The input and output unit 24 may be connected to the terminal apparatus 20 as an external input device instead of being provided in the terminal apparatus 20. For example, a selected scheme, such as USB, HDMI (registered trademark), and Bluetooth (registered trademark), may be used as a connection scheme. The input and output unit 24 does not need to be integrated and may be made up of an input unit and an output unit separately. In this case, the input unit includes at least one input interface, such as a physical key, a capacitance key, a pointing device, and a microphone. The output unit includes at least one output interface, such as a display and a speaker.

The functions of the terminal apparatus 20 are implemented by the processor corresponding to the control unit 21, running a terminal program according to the present embodiment. In other words, the functions of the terminal apparatus 20 are implemented by software. The terminal program causes a computer to execute the operation of the terminal apparatus 20 to cause the computer to function as the terminal apparatus 20. In other words, the computer executes the operation of the terminal apparatus 20 in accordance with the terminal program to function as the terminal apparatus 20.

The program may be recorded on a non-transitory computer-readable medium (storage medium). The non-transitory computer-readable medium is, for example, a magnetic recording medium, an optical disk, a magneto-optical recording medium, or a semiconductor memory. Distribution of the program is performed by, for example, selling, transferring, or lending a portable recording medium, such as a DVD and a CD-ROM, on which the program is recorded. The DVD is an abbreviation of digital versatile disc. The CD-ROM is an abbreviation of compact disc read only memory. Alternatively, distribution of the program may be performed by storing the program in a storage of a server and transmitting the program from the server to another computer. Alternatively, the program may be provided as a program product.

A computer once stores, for example, a program recorded on a portable recording medium or a program transferred from a server in a main storage device. Then, the computer causes a processor to read the program stored in the main storage device and executes a process according to the read program on the processor. The computer may directly read a program from a portable recording medium and execute a process according to the program. Each time a program is transferred from a server to a computer, the computer may occasionally execute a process according to the received program. A program may be executed by a so-called ASP service in which a program is not transferred from a server to a computer and a function is implemented only by providing an execution instruction and acquiring a result. The ASP is an abbreviation of application service provider. A program is information subjected to a process on an electronic computer and includes those similar to a program. For example, data that is not a direct command to a computer and that has a property of defining a process of a computer corresponds to "those similar to a program".

One or some or all of the functions of the terminal apparatus 20 may be implemented by a dedicated circuit corresponding to the control unit 21. In other words, one or some or all of the functions of the terminal apparatus 20 may be implemented by hardware.

The configuration of the device 30 according to the present embodiment will be described with reference to FIG. 1.

The device 30 includes a control unit 31, a storage unit 32, a communication unit 33, an input unit 34, an output unit 35, and a power usage sensor 36.

The control unit 31 includes one or more processors, one or more programmable circuits, one or more dedicated circuits, or a combination of them. The processor is, for example, a general-purpose processor, such as a CPU and a GPU, or a special-purpose processor specialized in a specific process; however, the processor is not limited thereto. The programmable circuit is, for example, an FPGA; however, the programmable circuit is not limited thereto. The dedicated circuit is, for example, an ASIC; however, the dedicated circuit is not limited thereto. The control unit 31 controls the overall operation of the device 30 while controlling the units of the device 30.

The control unit 31 acquires a signal for controlling the device 30 by receiving the signal from the terminal apparatus 20 via the communication unit 33. The control unit 31 controls the operation of the device 30 in accordance with the acquired signal. Control details over the device 30 by the control unit 31 depend on the type of the device 30. When the device 30 is, for example, an air conditioner, the control unit 31 is able to execute control to start or stop the operation of the air conditioner, change the set temperature, change the operation mode, such as cooling, heating, dehumidification, and fan, and change the air volume, air direction, or the like.

When the device 30 is a room light, the control unit 31 is able to execute control to, for example, turn on or off the power of the room light and change the brightness. When the device 30 is a refrigerator, the control unit 31 is able to execute control to, for example, change the temperature setting of the refrigerator. When the device 30 is a television, the control unit 31 is able to execute control to, for example, turn on or off the power of the television, the brightness of the screen, the sound level, or the channel, and perform program recording.

The control unit 31 stores historical information indicating the usage history of the device 30, detected by a selected sensor, in the storage unit 22. The historical information includes histories of the number of times the user U has operated the device 30, time at which the power is turned on or off, a usage duration, the number of times the setting is changed within a predetermined period of time, in association with the identifier of the user U. When, for example, the device 30 is an air conditioner, the historical information may contain, for example, the number of times or time at which the user U has started or stopped the air conditioner within a predetermined period of time, and the number of times or time at which the user U has changed the setting of the operation mode, the set temperature, the air volume, or the air direction. When, for example, the device 30 is a room light, the historical information may contain, for example, the number of times or time at which the user U has switched the power of the room light between the on state and the off state within a predetermined period of time. When, for example, the device 30 is a refrigerator, the historical information may contain, for example, the number of times or time at which the user U has changed the temperature setting of the refrigerator within a predetermined period of time and the number of times or time at which the user U has opened the door of the refrigerator. When the device 30 is a television, the historical information may contain, for example, the number of times or time at which the user U has switched the power of the television between an on state and an off state within a predetermined period of time and the number of times or time at which the user U has changed the setting of the brightness of the screen, the sound level, the channel, program recording, or the like.

The storage unit 32 includes one or more memories. Examples of the memory include a semiconductor memory, a magnetic memory, and an optical memory; however, the memory is not limited thereto. Each memory included in the storage unit 32 may function as, for example, a main storage device, an auxiliary storage device, or a cache memory. The storage unit 32 stores selected information used in the operation of the device 30. For example, the storage unit 32 may store a system program, an application program, a database, and the like. Information stored in the storage unit 32 may be able to be updated with, for example, information acquired from the network via the communication unit 33.

The communication unit 33 includes at least one communication interface. The communication interface supports, for example, a mobile communication standard, such as 4G and 5G, a wired LAN standard, or a wireless LAN standard; however, the standard supported by the communication interface is not limited thereto. The communication interface may support a selected communication standard. The communication unit 33 receives information used in the operation of the device 30 and sends information obtained through the operation of the device 30.

The input unit 34 includes at least one input interface. The input interface is, for example, a physical key, a capacitance key, a pointing device, a touch screen provided integrally with a display, or a microphone. The input unit 34 receives an operation to input information used in the operation of the device 30. The input unit 34 may be connected to the device 30 as an external input device instead of being provided in the device 30. For example, a selected scheme, such as USB, HDMI (registered trademark), and Bluetooth (registered trademark), may be used as a connection scheme.

The output unit 35 includes at least one output interface. The output interface is, for example, a display or a speaker. The display is, for example, an LCD or an organic EL display. The output unit 35 outputs information obtained through the operation of the device 30. The output unit 35 may be connected to the device 30 as an external output device instead of being provided in the device 30. For example, a selected scheme, such as USB, HDMI (registered trademark), and Bluetooth (registered trademark), may be used as a connection scheme.

The power usage sensor 36 detects the amount of electric power used by the device 30 for a predetermined period of time and outputs the amount of electric power used to the control unit 31.

The functions of the device 30 are implemented by the processor serving as the control unit 41, running a selected device program. In other words, the functions of the device 30 are implemented by software. The device program causes a computer to execute the operation of the device 30 to cause the computer to function as the device 30. In other words, the computer executes the operation of the device 30 in accordance with the device program to function as the device 30.

One or some or all of the functions of the device 30 may be implemented by a programmable circuit or a dedicated circuit serving as the control unit 31. In other words, one or some or all of the functions of the device 30 may be implemented by hardware.

The operation of the system 10 according to the present embodiment will be described with reference to FIG. 2, FIG. 3, FIG. 4, FIG. 5, FIG. 6A, and FIG. 6B. The operation of the terminal apparatus 20 corresponds to a method according to the present embodiment. FIG. 2, FIG. 3, FIG. 4, and FIG. 5 respectively show examples of a screen displayed on the input and output unit 24 according to the present embodiment. FIG. 6A and FIG. 6B show a process flowchart of the overall system 10 according to the present embodiment. Hereinafter, the terminal apparatus 20 exchanges information with the device 30 via the communication unit 33.

In step S101, the control unit 21 of the terminal apparatus 20 identifies a device 30 to be controlled, as a subject device 30. The control unit 21 may identify a subject device 30 by receiving input to select a device 30 by the user U. In this case, for example, the control unit 21 of the terminal apparatus 20 may display a screen via the input and output unit 24 to prompt the user U to select a device 30 intended to control, from among the plurality of devices 30 connected to the terminal apparatus 20. The control unit 21 identifies the device 30 selected by the user U via the input and output unit 24 as a subject device 30. A technique for identifying a subject device 30 is not limited thereto. For example, the control unit 21 may automatically identify a device 30 connected via the communication unit 23 as a subject device 30. In the present embodiment, it is assumed that the identified devices 30 are an air conditioner, a refrigerator, a room light, and a television in operation.

In step S102, each of the subject devices 30 sends information indicating the amount of electric power used to the terminal apparatus 20. Specifically, in each of the subject devices 30, the control unit 31 of the device 30 acquires information indicating the amount of electric power used, detected by the power usage sensor 36, and sends the information to the terminal apparatus 20. The subject devices 30 may constantly send information indicating the amount of electric power used or may send the information in response to a request from the terminal apparatus 20.

In step S103, the control unit 21 of the terminal apparatus 20 acquires information indicating the amounts of electric power respectively used by the subject devices 30 by receiving the information from each of the subject devices 30. In the present embodiment, the amounts of electric power used by the air conditioner, the refrigerator, the room light, and the television are respectively Al, R1, L1, and T1. It is assumed that the amount of electric power used Al is the highest value and, subsequently, the amounts of electric power used Ll, R1, T1 decrease in descending order.

In step S104, the control unit 21 acquires a target amount of electric power used by each of the subject devices 30. A selected technique may be adopted to acquire a target amount of electric power used.

The control unit 21 may acquire a disaster target amount that is a target amount of electric power used in a disaster, as a target amount. A disaster target amount is a target amount of electric power used in order for the user U to save electric power by reducing the amount of electric power used in the event of shortage of electric power or power outage due to a disaster, such as earthquake, flood, volcanic eruption, and landslide. The control unit 21 may store a disaster target amount in the storage unit 22 and acquire the disaster target amount by reading the disaster target amount from the storage unit 22, or may acquire a disaster target amount from an external device. A disaster target amount may be set in advance for each device 30 according to how much the amount of electric power used needs to be saved in a disaster. For example, a disaster target amount may be set to a value that is the same as the amount of electric power used during normal times for the refrigerator that the user U needs to continue using even in a disaster, and a disaster target amount may be set as a value less than the average value of the amount of electric power used during normal times for the television. The control unit 21 may determine that a disaster has occurred when the control unit 21 receives, from an external device, information indicating that the disaster has occurred, and acquire a disaster target amount as a target amount. The control unit 21 may acquire a measured value detected by a selected sensor provided in the home of the user U or near the home, determine that a disaster has occurred when the measured value is greater than or equal to a predetermined value, and acquire a disaster target amount as a target amount.

A target amount that the control unit 21 acquires is not limited thereto and may be set to a selected value. For example, the control unit 21 may acquire the amounts of electric power respectively used by other plurality of users different from the user U for the same device 30, calculate the average value of the amounts of electric power used, and acquire the average value as a target amount. For example, the control unit 21 may identify a device 30 of which the amount of electric power used is high by comparing the average value of the amount of electric power used by user U with the average value of the amount of electric power used by the user U for the device 30 last year, and acquire the average value as a target amount of electric power used by the identified device 30.

In the present embodiment, the control unit 21 acquires a target amount from the storage unit 22 by reading a target amount set in advance by the user U. In the present embodiment, it is assumed that the target amounts of electric power respectively used by the air conditioner, the refrigerator, the room light, and the television are respectively A2, R2, L2, and T2.

In step S105, each of the subject devices 30 sends historical information indicating the usage history of the device 30 to the terminal apparatus 20. The device 30 may constantly send historical information or may send the information in response to a request from the terminal apparatus 20. The control unit 31 of the device 30 generates historical information from the history of usage of the device 30 by the user U, detected by a selected sensor, over a predetermined period of time, and stores the historical information in the storage unit 32. The control unit 31 reads the historical information from the storage unit 32 and sends the historical information to the terminal apparatus 20 via the communication unit 33.

In step S106, the control unit 21 of the terminal apparatus 20 acquires the historical information of the subject devices 30 by receiving the historical information from each of the subject devices 30.

In step S107, the control unit 21 causes the input and output unit 24 to display at least one first region indicating the amount of electric power used by the subject device 30 by area. FIG. 2 shows an example of a screen that the control unit 21 causes the input and output unit 24 to display. The control unit 21 displays a plurality of first regions each having an area corresponding to the amount of electric power used by the associated device 30, in a display area D on the input and output unit 24. In the present embodiment, a first region 1A corresponding to the amount of electric power A1 used by the air conditioner, a first region 1B corresponding to the amount of electric power R1 used by the refrigerator, a first region 1L corresponding to the amount of electric power L1 used by the room light, and a first region 1T corresponding to the amount of electric power T1 used by the television are displayed.

The control unit 21 divides a remaining region obtained by leaving a selected margin from the top, bottom, right, and left of the display area D into the number of the subject devices 30 identified in step S101. The control unit 21 changes the size of each of the divided display areas D in accordance with the ratio among the amounts of electric power used, acquired in step S103. In the present embodiment, it is assumed that the devices 30 identified in step S101 are the air conditioner, the room light, the refrigerator, and the television and the ratio among the amounts of electric power respectively used by these devices 30 is 4:3:2:1. The control unit 21 expands or contracts each of the divided display areas D in accordance with the ratio among the amounts of electric power used. An expansion or contraction condition may be set to a selected condition. For example, the divided display area D may be expanded to a predetermined size for the device 30 of which the ratio of the amount of electric power used is higher than or equal to a predetermined value, and the divided display area D may be contracted to a predetermined size for the device 30 of which the ratio is lower than the predetermined value.

The control unit 21 causes the input and output unit 24 to display the four divided display areas D as the first regions respectively indicating the amounts of electric power respectively used by the devices 30 by area. FIG. 2 shows an example of each of the first regions that the control unit 21 causes the input and output unit 24 to display. In FIG. 2, a first region 1A, a first region 1L, a first region 1R, and a first region 1T respectively indicating the amounts of electric power respectively used by the air conditioner, the room light, the refrigerator, and the television are shown. As is apparent from FIG. 2, the first region is displayed such that the area of the first region increases as the ratio of the amount of electric power used increases.

Not limited to this configuration, the control unit 21 may divide the display area D by reading a preset template stored in the storage unit 22. The template may be created according to the number of the subject devices 30. When, for example, the number of the subject devices 30 is three, the template may be configured to include the display area D divided into one left-side part and two up and down parts divided from a right-side part or may be configured to include three vertical or horizontal divided parts from the display area D. The template may be created by dividing the display area D at a predetermined ratio, such as a golden ratio. The control unit 21 may read a template appropriate for the number of the subject devices 30 from the storage unit 22 and display the first regions for the devices 30 such that the areas of the divided display areas D represented by the template are set in descending order for the devices 30 in descending order of the ratio among the amounts of electric power used.

In step S108 of FIG. 6A, the control unit 21 determines the subject device 30 of which the usage frequency of the user U is high by using the historical information acquired in step S106 and causes the input and output unit 24 to preferentially display the first region for the determined subject device 30.

A usage frequency is a frequency that a user performs a predetermined operation to a device. The control unit 21 may calculate a frequency by averaging the number of times the user U has performed an operation to the device 30 within a predetermined period from the historical information. Examples of the frequency include the frequency that the power of the device 30 is turned on or off, the frequency that the set temperature of the air conditioner or the like is changed, the frequency that the brightness of the room light is changed, the frequency that the channel of the television is changed, and the frequency that the door of the refrigerator is opened and closed. The control unit 21 determines the device 30 of which the usage frequency is higher than or equal to a predetermined value, as a subject device 30 of which the usage frequency is high. The control unit 21 may rank the devices 30 in descending order of usage frequency and determine the ranking.

The control unit 21 causes the input and output unit 24 to preferentially display the first region for the device 30 of which the usage frequency is high at a predetermined location, such as the upper part of the display area D. A preferential display condition may be set to a selected condition. For example, the first regions may be preferentially displayed in a line in order from the upper part to the lower part of the display area D or from the lower part to the upper part in descending order of usage frequency or preferentially displayed in order from the left to the right or from the right to the left. In the present embodiment, the control unit 21 causes the input and output unit 24 to preferentially display the first regions in order from the upper left to the lower right of the display area D in descending order of usage frequency.

In the present embodiment, it is assumed that the control unit 21 determines that the usage frequency of the device 30 decreases in order of the refrigerator, the air conditioner, the room light, and the television. As shown in FIG. 2, the control unit 21 causes the input and output unit 24 to display the first region 1R for the refrigerator, the first region 1A for the air conditioner, the first region 1L for the room light, and the first region 1T for the television in order from the upper left to the lower right of the display area D. A preferential display technique may be freely set by the user U. In this way, the control unit 21 determines a subject device 30 of which the usage frequency of the user U is high by using the acquired historical information and causes the input and output unit 24 to preferentially display the first region for the determined subject device 30.

In step S109 of FIG. 6B, the control unit 21 causes the input and output unit 24 to display a second region indicating the target amount acquired in step S104 by area such that the second region overlaps the associated first region.

A second region is a two-dimensional image displayed on the input and output unit 24. The control unit 21 may determine the size of the area of a second region in accordance with a selected condition. For example, the control unit 21 may determine the size of the area of the second region in accordance with the ratio between the amount of electric power used, acquired in step S103, and the target amount acquired in step S104. For example, when the amount of electric power used is higher by 10% than the target amount, an area larger by 10% than the area of the first region may be determined as the area of the second region; whereas, when the amount of electric power used is lower by 10% than the target amount, an area smaller by 10% than the area of the first region may be determined as the area of the second region. When a difference between the amount of electric power used and the target amount is less than a predetermined value, the control unit 21 may determine the area of the size equivalent to the area of the first region as the area of the second region. The predetermined value may be set to a selected value.

In the present embodiment, it is assumed that the amount of electric power used by the air conditioner is less by 10% than the target amount, the amount of electric power used by the room light is greater by 10% than the target amount, a difference between the amount of electric power used by the refrigerator and the associated target amount is less than the predetermined value, and a difference between the amount of electric power used by the television and the associated target amount is less than the predetermined value. The control unit 21 determines an area larger by 10% than the area of the first region 1A for the air conditioner as the second region 2A for the air conditioner, determines an area smaller by 10% than the area of the first region 1L for the room light as the second region 2L for the room light, determines an area equivalent to the area of the first region 1R for the refrigerator as the second region 2R for the refrigerator, and determines an area equivalent to the area of the first region 1T for the television as the second region 2T for the television.

Figure 3:
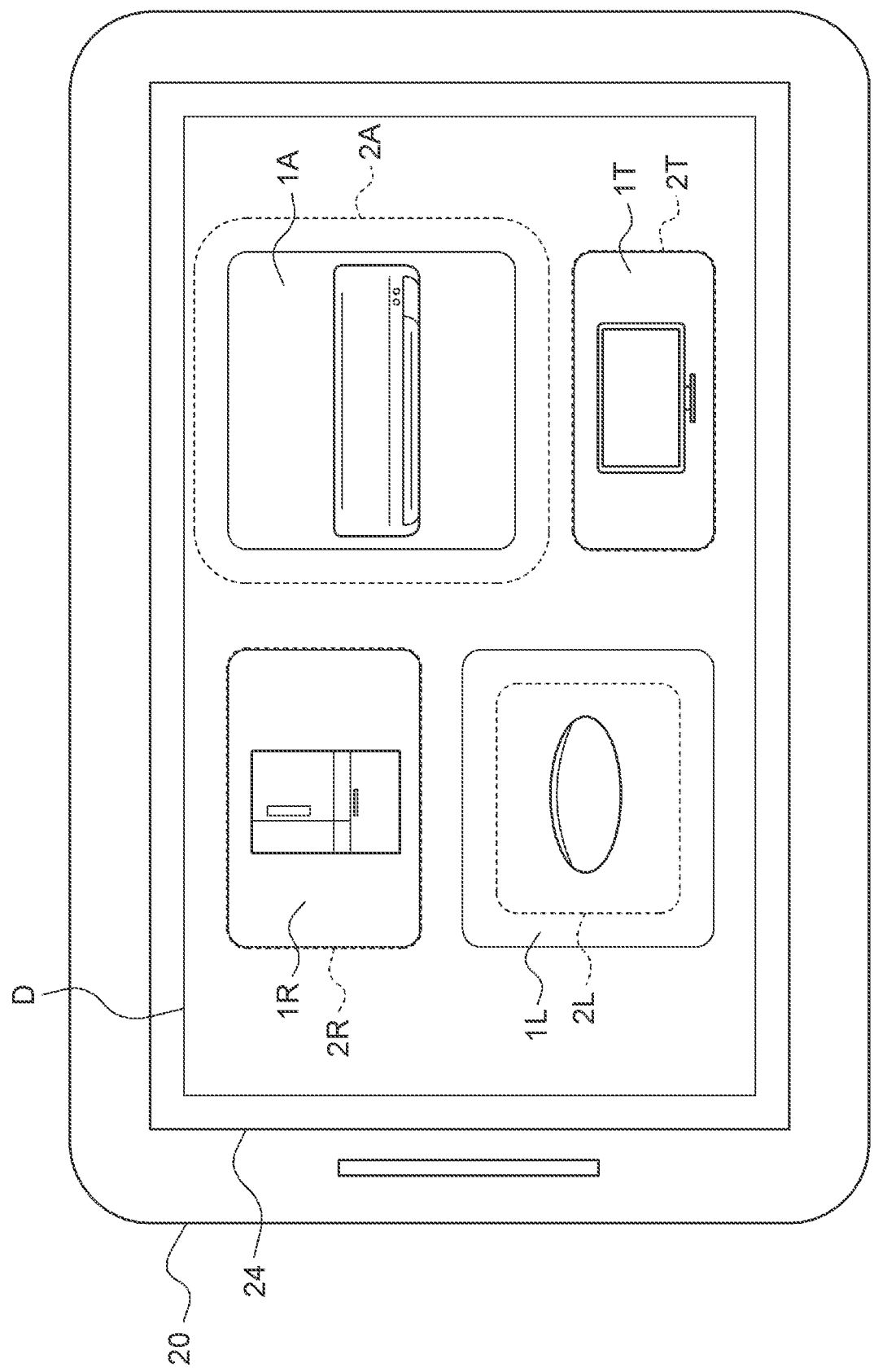
FIG. 3 is a view showing an example of a screen displayed on the input and output unit of the terminal apparatus according to the embodiment of the disclosure.

The control unit 21 causes the input and output unit 24 to display the second regions with the determined areas over the associated first regions, respectively. FIG. 3 shows a state where the second regions of the subject devices 30 are respectively displayed over the first regions in the present embodiment. As shown in FIG. 3, in the present embodiment, the control unit 21 causes the input and output unit 24 to display the second regions by dashed lines; however, a technique for displaying the second regions is not limited thereto. For example, a second region may be a translucent region with an area, and may be displayed such that the user U is able to visually recognize and compare the overlapped first region and second region. As shown in FIG. 3, the second region 2R is displayed over the first region 1R for the refrigerator, and the second region 2A is displayed over the first region 1A for the air conditioner. Since the second region 2T for the television is determined to have the same area as the first region 1T and the second region 2L for the room light is determined to have the same area as the first region 1L, the second regions are respectively displayed over the first regions without any deviation.

In step S110, the control unit 21 receives input of an operation to expand or contract the first region by the user U. The control unit 21 changes the size of the area of the first region in accordance with an operation of the user U to pinch in or pinch out the first region with finger tips on the input and output unit 24. A technique for receiving input of an operation is not limited thereto, and a selected technique may be adopted. For example, the control unit 21 may receive input of a numeric value of a percentage to expand or contract a first region. The control unit 21 may complete reception when the control unit 21 determines that the operation of input has ended when the fingers of the user U separate from the input and output unit 24 or may cause a button showing the text "Input Complete" to be displayed and, when the user U selects the button, determine that the operation of input has ended to complete reception.

Figure 4:
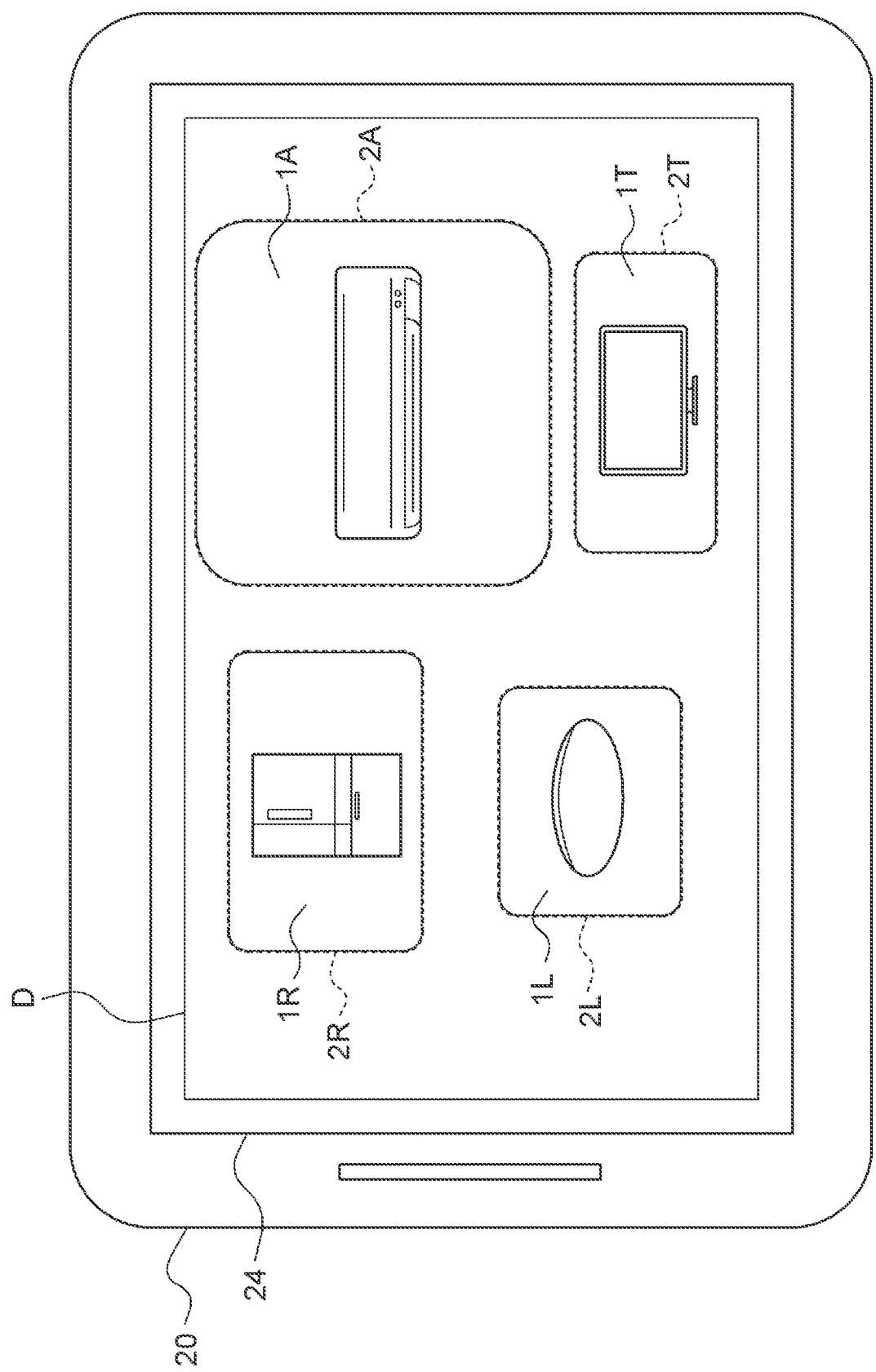
FIG. 4 is a view showing an example of a screen displayed on the input and output unit of the terminal apparatus according to the embodiment of the disclosure.

In the present embodiment, it is assumed that the user U pinches out to expand the first region 1A for the air conditioner shown in FIG. 3 by 10% via the input and output unit 24 and pinches in to reduce the first region 1L for the room light by 10%, and the screen on the input and output unit 24 has changed from the state shown in FIG. 3 to the state shown in FIG. 4. As shown in FIG. 4, the first region 1A for the air conditioner changes so as to have the same area as the second region 2A, and the first region 1L for the room light changes so as to have the same area as the second region 2L.

In step S111, the control unit 21 acquires a controlled variable for controlling the subject device 30. Specifically, the control unit 21 acquires a controlled variable for controlling the device 30 concerned with the first region by determining a variation in the area of the first region between before an operation of the user U and after the operation as the controlled variable. The relationship between a variation in area and a controlled variable may be determined under a selected condition according to the function of the device 30. For example, the control unit 21 may determine the controlled variable of the subject device 30 from the ratio of the size of the area of the first region between before an operation of the user U and after the operation. The control unit 21 may acquire a controlled variable by determining the controlled variable of the device 30 such that the amount of electric power used by the device 30 increases in proportion to the amount by which the area is increased when the area of the first region after the operation is expanded as compared to the area before the operation and determining the controlled variable of the device 30 such that the amount of electric power used by the device 30 is reduced in proportion to the amount by which the area of the first region after the operation is reduced as compared to the area before the operation.

The details of control using the acquired controlled variable may be set to selected control details in accordance with the type of the device 30. For example, for the device 30, the controlled variable may be determined such that the power of the device 30 turns on when the area of the first region expands by 10% and the power of the device 30 turns off when the area of the first region contracts by 10%. When, for example, the subject device 30 is an air conditioner, the controlled variable may be determined such that the set temperature of the air conditioner changes by one degree when the area of the first region expands by 10% or contracts by 10%. In this case, in a springtime or a summer time, the controlled variable may be determined such that the set temperature of the air conditioner decreases by one degree when the area of the first region expands by 10% and the set temperature of the air conditioner increases by one degree when the area of the first region contracts by 10%. On the other hand, in an autumntime or a wintertime, the controlled variable may be determined such that the set temperature of the air conditioner increases by one degree when the area of the first region expands by 10% and the set temperature of the air conditioner decreases by one degree when the area of the first region contracts by 10%. When the subject device 30 is a room light, the controlled variable may be determined such that the brightness of the room light gets lighter by one level when the area of the first region expands by 10% and the brightness of the room light gets darker by one level when the area of the first region contracts by 10%. When the subject device 30 is a refrigerator, the controlled variable may be determined such that the temperature in the refrigerator decreases by one degree when the area of the first region expands by 10% and the temperature in the refrigerator increases by one degree when the area of the first region contracts by 10%. When the subject device 30 is a television, the controlled variable may be determined such that the sound level of the television or the brightness of the screen increases by one level when the area of the first region expands by 10% and the sound level of the television or the brightness of the screen decreases by one level when the area of the first region contracts by 10%.

In the present embodiment, the user U pinches out to expand the first region 1A for the air conditioner by 10% and pinches in to contract the first region 1L for the room light by 10%. The control unit 21 acquires a controlled variable for changing the set temperature of the air conditioner by one degree and a controlled variable for decreasing the brightness of the room light by one level. In the present embodiment, it is assumed that a change in the set temperature of the air conditioner means that the set temperature is decreased by one degree.

In step S112, the control unit 21 sends a signal to the subject device 30 to control the subject device 30 with the controlled variable acquired in step S111. In the present embodiment, the control unit 21 sends a signal to the air conditioner to control the air conditioner such that the set temperature is decreased by one degree and sends a signal to the room light to control the room light such that the brightness is decreased by one level.

In step S113, each of the subject devices 30 receives the signal sent from the terminal apparatus 20 to operate. In the present embodiment, the set temperature of the air conditioner decreases by one degree, and the brightness of the room light decreases by one level.

As shown in step S110, step S111, step S112, and step S113, the control unit 21 receives input of an operation to expand or contract the first region and controls the subject device 30 in accordance with the operation.

In step S114, the control unit 21 receives an operation of the user U to select the first region. A selecting operation may include a selected operation and may include, for example, an operation that the user U taps, presses and holds, flicks, or swipes the first region for a selected subject device 30 displayed on the input and output unit 24.

In step S115, the control unit 21 causes the input and output unit 24 to display information on the device 30 associated with the first region. After that, the process of the system 10 ends.

Information on the device 30 may include repair information indicating whether the device 30 needs to be repaired. The repair information is information indicating whether the device 30 associated with the first region selected by the user U needs to be repaired. The repair information may include not only whether a failure of the device 30 needs to be handled but also whether a predetermined component needs to be replaced, for example, whether a filter of an air conditioner needs to be replaced. The repair information may include selected pieces of information, such as a component of the device 30 that needs to be repaired, contact information of a repair shop that can be asked for repair, a repair shop located within a predetermined distance from the current location of a terminal apparatus, and a procedure in the case where the user repairs by him or herself. When the control unit 21 receives, from a device 30, information indicating a component that needs repair or a need of replacement of a predetermined component, the control unit 21 may acquire repair information by generating the repair information and store the repair information in the storage unit 22. The control unit 21 may acquire information on a repair shop from an external device and generate repair information. When the user selects the first region for the device 30, the control unit 21 reads the repair information from the storage unit 22 and causes the input and output unit 24 to display the repair information. Not limited to this, when the control unit 21 generates repair information, the control unit 21 may cause the input and output unit 24 to display the repair information.

Information on a device 30 may include advertisement information that indicates information on another device alternative to the device 30. The advertisement information may include information on the price, release date, and new function of the latest model of the device 30 associated with the first region selected by the user U. The control unit 21 may store the purchase date of the device 30 in the storage unit 22, acquire information on the price, release date, new function, and the like of the latest model of the device 30 from an external device when a predetermined period has elapsed from the purchase date, generate advertisement information, and store the advertisement information in the storage unit 22. When the user U selects the first region for the device 30, the control unit 21 reads the advertisement information from the storage unit 22 and causes the input and output unit 24 to display the advertisement information. Not limited to this, when the control unit 21 generates advertisement information, the control unit 21 may cause the input and output unit 24 to display the advertisement information.

Not limited to the above-described configuration, information on a device 30 may include historical information acquired in step S106, information indicating a change in the amount of electric power used by the device 30 in a predetermined period, or information indicating a date on which the device 30 is purchased and a past history of repair. Information on a device 30 may further include information indicating control recommended for the device 30.

For example, the control unit 21 may acquire information indicating an activity schedule of the user U that the user U inputs to the terminal apparatus 20 and cause the input and output unit 24 to display control of the device 30 suited for the schedule as recommended control. When, for example, the user U is planned to go out a few hours later, timer setting for turning off the air conditioner a few hours later may be displayed as recommended control. In this case, a button for sending an instruction for control may be displayed together so that, after the user U sees the information indicating the recommended control, the air conditioner is able to be immediately controlled. When the user U selects the button, the control unit 21 may send a signal for control to perform timer setting to the air conditioner.

When, for example, the user U presets a preferred temperature and the current temperature of a room, detected by the air conditioner, is different from the preferred temperature, the control unit 21 may display control for setting the set temperature of the air conditioner to the preferred temperature as recommended control. In this case, when the user U selects a button for confirming an instruction for control, the control unit 21 may send a signal for executing control to change the set temperature to the temperature preferred by the user U to the air conditioner. When, for example, a predetermined temperature for measures against heat stroke is preset in the air conditioner as a recommended temperature and the current temperature of a room, detected by the air conditioner, is different from the recommended temperature, the control unit 21 may display control for setting the set temperature of the air conditioner to the recommended temperature as recommended control. In this case, when the user U selects a button for confirming an instruction for control, the control unit 21 may send a signal for executing control to change the set temperature to the recommended temperature, to the air conditioner.

Information on a device 30 may further include information indicating how much the amount of electric power used is saved for how the device 30 is controlled as an advice for energy saving. For example, the control unit 21 causes the input and output unit 24 to display information indicating how much the amount of electric power used is saved by how much the current set temperature of the air conditioner is changed. In this case, the control unit 21 may cause the input and output unit 24 to display a button for confirming an instruction for control together so that, after the user U sees the information, the air conditioner is able to be immediately controlled. When the user U selects the button, the control unit 21 may send a signal for executing control to save the amount of electric power used, to the air conditioner.

Figure 5:
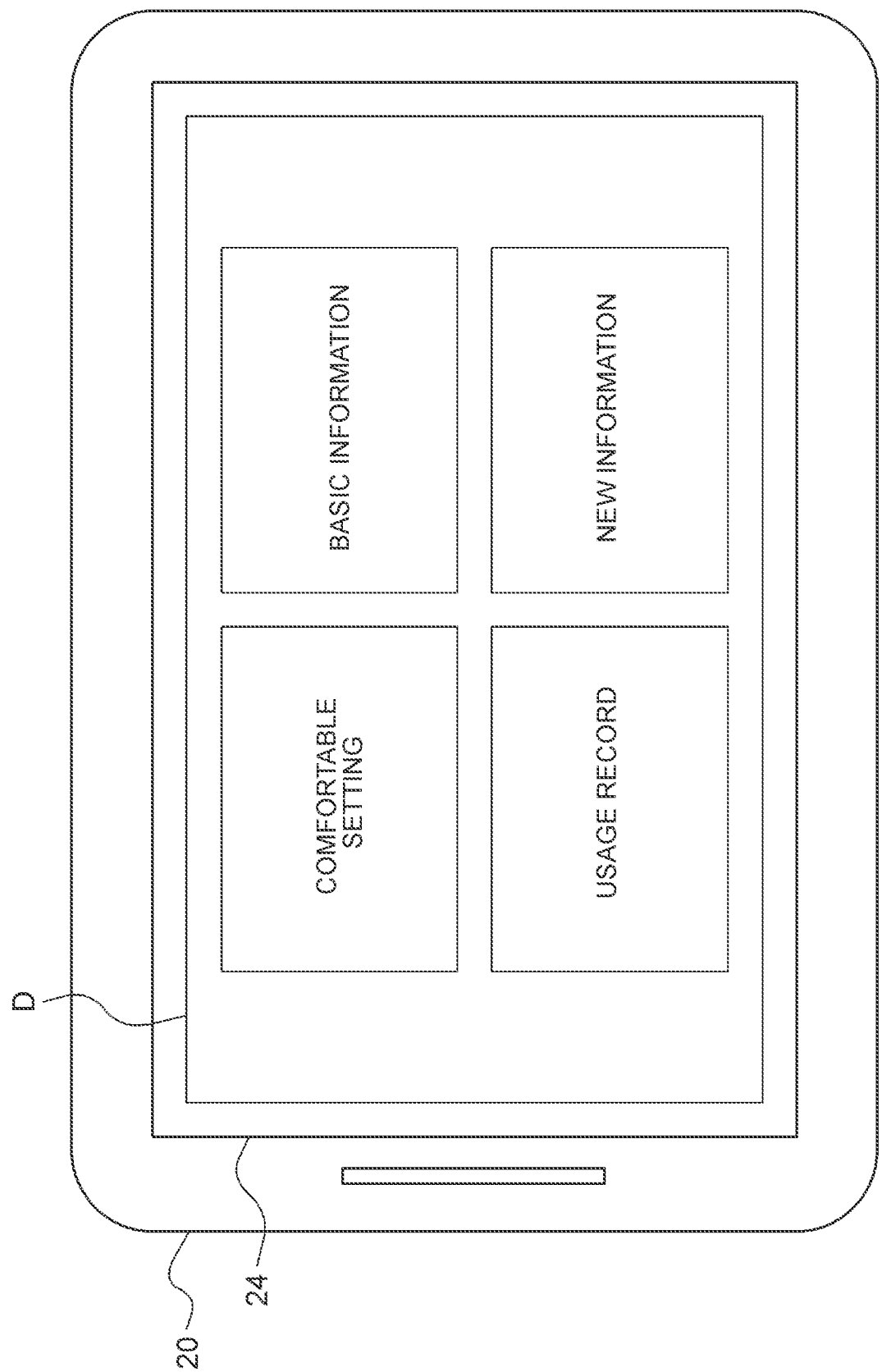
FIG. 5 is a view showing an example of a screen displayed on the input and output unit of the terminal apparatus according to the embodiment of the disclosure.

FIG. 5 is an example of a result that, when an operation to select the first region 1A for the air conditioner in FIG. 4 is received, the control unit 21 causes the input and output unit 24 to display a state of the screen, transitioned from the state of the screen in FIG. 4. As shown in FIG. 5, the control unit 21 may cause the input and output unit 24 to display a menu screen for information on the device 30. In the present embodiment, when the user selects the image "basic information" in FIG. 5, the control unit 21 causes the input and output unit 24 to display basic information on the air conditioner, such as a date on which the air conditioner was purchased or the past history of repair, by further transitioning the screen or on the image "basic information". When the user U selects the image "new information", the control unit 21 causes the input and output unit 24 to display advertisement information of the air conditioner by further transitioning the screen or on the image "new information". When the user U selects the image "usage record", the control unit 21 causes the input and output unit 24 to display information indicating a change of the amount of electric power used by the air conditioner in the past by further transitioning the screen or on the image "usage record". When the user U selects the image "comfortable setting", the control unit 21 causes the input and output unit 24 to display information indicating recommended control of the air conditioner by further transitioning the screen or on the image "comfortable setting".

As described above, the terminal apparatus 20 according to the present embodiment is a terminal apparatus that includes the communication unit 23 that communicates with at least one device 30 that the user U uses, the input and output unit 24, and the control unit 21. The control unit 21 identifies a device 30 to be controlled, of the devices 30, as a subject device 30, causes the input and output unit 24 to display at least one first region indicating the amount of electric power used by the subject device 30 by area, and receives input of an operation to expand or contract the first region and controls the subject device 30 in accordance with the operation.

According to the present embodiment, the user U is able to intuitively grasp the amount of electric power used by the device 30 from the first region displayed on the input and output unit 24. The user U is able to easily control the device 30 by inputting an operation to change the area of the first region. Thus, it is possible to improve a technique for improving the operability of a user by using an image as a graphical user interface.

As described above, in the terminal apparatus 20 according to the present embodiment, the control unit 21 acquires a target amount of electric power used by each subject device 30 and causes the input and output unit 24 to display a second region indicating the target amount by area such that the second region overlaps the associated first region.

According to the present embodiment, since the target amount of electric power used is displayed so as to overlap the current amount of electric power used, the user U intuitively grasp how much the subject device 30 is controlled to bring the amount of electric power used within the target amount, so the user U is able to easily control the device 30. Thus, it is possible to improve a technique for improving the operability of a user by using an image as a graphical user interface.

As described above, in the terminal apparatus 20 according to the present embodiment, when the control unit 21 receives an operation of the user U to select the first region, the control unit 21 causes the input and output unit 24 to display repair information indicating whether the subject device 30 associated with the first region needs to be repaired.

According to the present embodiment, when the user U intends to control the subject device 30, the user U is also able to grasp whether the device 30 needs to be repaired. Since controlling the subject device 30 and displaying information on whether repair is needed are performed with a series of operations, the user U is able to easily grasp whether the device 30 needs to be repaired. With this configuration, when the device 30 needs to be repaired, the user U is able to early handle the situation. Thus, it is possible to improve a technique for improving the operability of a user by using an image as a graphical user interface.

As described above, in the terminal apparatus 20 according to the present embodiment, when the control unit 21 receives an operation of the user U to select the first region, the control unit 21 causes the input and output unit 24 to display advertisement information on another device 30 alternative to the subject device 30 associated with the first region.

According to the present embodiment, when the user U intends to control the subject device 30, the user U is also able to grasp advertisement of a new product alternative to the device 30. Since controlling the subject device 30 and displaying information on a new product with a series of operations, the user U is able to easily grasp information on a new product. With this configuration, the user U is able to easily consider replacement purchase early. Thus, it is possible to improve a technique for improving the operability of a user by using an image as a graphical user interface.

As described above, in the terminal apparatus 20 according to the present embodiment, the control unit 21 acquires historical information indicating the usage history of each subject device 30, determines the subject device 30 of which the usage frequency of the user U is high by using the acquired historical information, and causes the input and output unit 24 to preferentially display the first region for the determined subject device 30.

According to the present embodiment, since the device 30 that the user U frequently uses is preferentially displayed, the user U is able to easily become aware of the amount of electric power used by the device 30. In addition, the user U is able to easily find the first region for the device 30 from the screen of the input and output unit 24 and input an operation for control. Thus, it is possible to improve a technique for improving the operability of a user by using an image as a graphical user interface.

As described above, in the terminal apparatus 20 according to the present embodiment, the control unit 21 acquires a disaster target amount that is a target amount of electric power used in a disaster, as the target amount.

According to the present embodiment, the user U is able to easily grasp how much the subject device 30 is controlled in a disaster in which the user U needs to particularly become aware of the amount of electric power used. The user U is able to input a similar operation to that during normal times in accordance with a target amount even in an emergency situation in a disaster in which, for example, the amount of electric power supplied is limited, and is able to safely control the subject device 30. Thus, it is possible to improve a technique for improving the operability of a user by using an image as a graphical user interface.

First Modification

As a first modification of the embodiment of the disclosure, the control unit 21 may determine whether each of the first regions falls within the associated second region as a result of input of an operation of the user U.

When the control unit 21 determines that each of the first regions does not fall within the associated second region, the control unit 21 causes the input and output unit 24 to display notification prompting for making the first region fall within the second region. When, for example, the input and output unit 24 is in the state of FIG. 3, it is assumed that, as the result that the user U inputs an operation to change the area of the first region 1A of the air conditioner, the first region 1A has an area greater than the second region 2A and the first region 1A extends off the second region 2A. In this case, the control unit 21 determines that the first region 1A of the air conditioner does not fall within the second region 2A and outputs notification prompting for making the first region 1A fall within the second region 2A via the input and output unit 24.

The notification may be, for example, a selected text message, such as "It seems to exceed a target amount". Not limited to the text message, and the message may be reproduced by voice. The notification may include a change in the color of the first region or performing a specific operation, such as vibrating the overall first region.

As described above, in the terminal apparatus 20 according to the present modification, when each of the first regions does not fall within the associated second region as a result of input of an operation, the control unit 21 causes the input and output unit 24 to display notification prompting for making the first region fall within the second region.

According to the present modification, the user U is able to immediately find the fact that the amount of electric power used by the device 30 to be controlled as a result of an input operation exceeds a target amount. The user U is able to easily input an operation to change the area of the first region again by referring to the notification. Thus, it is possible to improve a technique for improving the operability of a user by using an image as a graphical user interface.

Second Modification

As a second modification of the disclosure, the control unit 21 may determine whether the acquired amount of electric power used is greater than the acquired target amount, may cause the input and output unit 24 to display the second region when the amount of electric power used is greater than the target amount, and does not need to cause the input and output unit 24 to display the second region when the amount of electric power used is less than the target amount. According to the present modification, only when the amount of electric power used is greater than the target amount, the second region is displayed, so the user U is able to further clearly grasp a device of which the amount of electric power used exceeds the target amount.

The disclosure is not limited to the above-described embodiment. For example, the plurality of blocks shown in the block diagrams may be integrated or one block may be divided. Instead of executing a plurality of steps described in the flowchart in time sequence in accordance with the description, the steps may be executed in parallel or in different order in accordance with the processing capacity of an apparatus that executes steps or as needed. Modifications are possible without departing from the purport of the disclosure.

What is claimed is:

1. A terminal apparatus comprising:
a communication interface configured to communicate with at least one device that a user uses;
a touch screen; and
a processor, wherein:
the processor is configured to;
identify a device to be controlled, of the at least one device, as a subject device;
cause the touch screen to display at least one first region indicating an amount of electric power used by the subject device by area;
receive input of an operation to expand or contract the first region and control the subject device in accordance with the operation;
acquire a target amount of electric power used by each subject device; and
cause the touch screen to display a second region indicating the target amount by area such that the second region overlaps the first region.

2. The terminal apparatus according to claim 1, wherein the processor is configured to, when each first region does not fall within the associated second region as a result of input of the operation, cause the touch screen to display notification prompting for making the first region fall within the associated second region.

3. The terminal apparatus according to claim 1, wherein the processor is configured to, upon receiving an operation of the user to select the first region, cause the touch screen to display repair information indicating whether repair of the subject device associated with the first region is needed.

4. The terminal apparatus according to claim 1, wherein the processor is configured to, upon receiving an operation of the user to select the first region, cause the touch screen to display advertisement information on another device alternative to the subject device associated with the first region.

5. The terminal apparatus according to claim 1, wherein the processor is configured to:
   acquire historical information indicating a usage history of the subject device; and
   determine a subject device of which the usage frequency of the user is high by using the acquired historical information and cause the touch screen to preferentially display the first region for the determined subject device.

6. The terminal apparatus according to claim 1, wherein the processor is configured to acquire a disaster target amount that is a target amount of electric power used in a disaster, as the target amount.

7. A method that is executed by a computer including a touch screen and a communication interface configured to communicate with at least one device that a user uses, the method comprising:
   identifying a device to be controlled, of the at least one device, as a subject device;
   causing the touch screen to display at least one first region indicating an amount of electric power used by the subject device by area;
   receiving input of an operation to expand or contract the first region and controlling the subject device in accordance with the operation;
   acquiring a target amount of electric power used by each subject device; and
   causing the touch screen to display a second region indicating the target amount by area such that the second region overlaps the first region.

8. The method according to claim 7, further comprising, when each first region does not fall within the associated second region as a result of input of the operation, causing the touch screen to display notification prompting for making the first region fall within the associated second region.

9. The method according to claim 7, further comprising, upon receiving an operation of the user to select the first region, causing the touch screen to display repair information indicating whether repair of the subject device associated with the first region is needed.

10. The method according to claim 7, further comprising, upon receiving an operation of the user to select the first region, causing the touch screen to display advertisement information on another device alternative to the subject device associated with the first region.

11. The method according to claim 7, further comprising:
    acquiring historical information indicating a usage history of the subject device; and
    determining a subject device of which the usage frequency of the user is high by using the acquired historical information and causing the touch screen to preferentially display the first region for the determined subject device.

12. The method according to claim 7, further comprising acquiring a disaster target amount that is a target amount of electric power used in a disaster, as the target amount.

13. A non-transitory storage medium that stores a program causing a computer including a touch screen and a communication interface configured to communicate with at least one device that a user uses, to execute functions, the functions comprising:
    identifying a device to be controlled, of the at least one device, as a subject device;
    causing the touch screen to display at least one first region indicating an amount of electric power used by the subject device by area;
    receiving input of an operation to expand or contract the first region and controlling the subject device in accordance with the operation;
    acquiring a target amount of electric power used by each subject device; and
    causing the touch screen to display a second region indicating the target amount by area such that the second region overlaps the first region.

14. The storage medium according to claim 13, wherein the functions further include, when each first region does not fall within the associated second region as a result of input of the operation, causing the touch screen to display notification prompting for making the first region fall within the associated second region.

15. The storage medium according to claim 13, wherein the functions further include, upon receiving an operation of the user to select the first region, causing the touch screen to display repair information indicating whether repair of the subject device associated with the first region is needed.

16. The storage medium according to claim 13, wherein the functions further include, upon receiving an operation of the user to select the first region, causing the touch screen to display advertisement information on another device alternative to the subject device associated with the first region.

17. The storage medium according to claim 13, wherein the functions further include:
    acquiring historical information indicating a usage history of the subject device; and
    determining a subject device of which the usage frequency of the user is high by using the acquired historical information and causing the touch screen to preferentially display the first region for the determined subject device.

* * * * *

UNITED STATES PATENT AND TRADEMARK OFFICE
CERTIFICATE OF CORRECTION

| | | |
|---|---|---|
| PATENT NO. | : 12,341,339 B2 | Page 1 of 1 |
| APPLICATION NO. | : 17/894502 | |
| DATED | : June 24, 2025 | |
| INVENTOR(S) | : Takumi Shibano | |

It is certified that error appears in the above-identified patent and that said Letters Patent is hereby corrected as shown below:

On the Title Page

Please insert:
--(30) Foreign Application Priority Data
Sept. 6, 2021 (JP).....................2021-145038--

Signed and Sealed this
Thirtieth Day of September, 2025

John A. Squires
*Director of the United States Patent and Trademark Office*